(12) United States Patent
Hayashi (10) Patent No.: US 8,031,742 B2
(45) Date of Patent: Oct. 4, 2011

(54) COMMUNICATION BANDWIDTH MEASUREMENT APPARATUS, RECORDING MEDIUM ON WHICH PROGRAM IS RECORDED, AND METHOD

(75) Inventor: Koichi Hayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 103 days.

(21) Appl. No.: 12/289,786

(22) Filed: Nov. 4, 2008

(65) Prior Publication Data

US 2009/0122716 A1 May 14, 2009

(30) Foreign Application Priority Data

Nov. 14, 2007 (JP) ................................ 2007-296025

(51) Int. Cl.
*H04J 3/16* (2006.01)
*G06F 15/16* (2006.01)

(52) U.S. Cl. .................... 370/468; 370/408; 709/203

(58) Field of Classification Search .......... 370/241–253, 370/408, 468, 216, 229–235, 236, 333, 389–391, 370/395.41; 709/201–203, 219, 223, 224, 709/238, 236, 227–234; 345/501–505, 545, 345/562
See application file for complete search history.

(56) References Cited

U.S. PATENT DOCUMENTS

| | | | | |
|---|---|---|---|---|
| 6,266,346 | B1 * | 7/2001 | Takeda et al. ................. | 370/468 |
| 6,269,080 | B1 * | 7/2001 | Kumar .......................... | 370/236 |
| 6,614,349 | B1 * | 9/2003 | Proctor et al. ............. | 340/572.1 |
| 7,185,077 | B1 * | 2/2007 | O'Toole et al. ................ | 709/223 |
| 7,483,380 | B2 * | 1/2009 | Metke ........................... | 370/238 |
| 7,633,887 | B2 * | 12/2009 | Panwar et al. ................ | 370/254 |
| 7,876,696 | B2 * | 1/2011 | Kotelba ......................... | 370/252 |
| 7,936,781 | B2 * | 5/2011 | Ozaki ........................... | 370/468 |
| 2002/0186212 | A1 * | 12/2002 | Matsumoto et al. .......... | 345/204 |
| 2002/0194361 | A1 * | 12/2002 | Itoh et al. ...................... | 709/233 |
| 2004/0143672 | A1 * | 7/2004 | Padmanabham et al. ..... | 709/231 |
| 2005/0276263 | A1 * | 12/2005 | Suetsugu et al. ............. | 370/389 |
| 2006/0120282 | A1 * | 6/2006 | Carlson et al. ................ | 370/229 |
| 2006/0155873 | A1 * | 7/2006 | Twata et al. ................... | 709/240 |

(Continued)

FOREIGN PATENT DOCUMENTS

JP       A 2006-197400       7/2006

OTHER PUBLICATIONS

"Goo speed test," (http://speedtest.goo.ne.jp/flash.htm) NTT Resonant Inc., Oct. 25, 2007.

(Continued)

*Primary Examiner* — Aung S Moe
*Assistant Examiner* — Prince Mensah
(74) *Attorney, Agent, or Firm* — Oliff & Berridge, PLC (57) ABSTRACT

To provide a terminal apparatus, a program, and a communication bandwidth determination method which can correctly measure a communication bandwidth, without providing a server apparatus which measures the communication bandwidth.

A controller of a measuring terminal apparatus fixes a measurement bit rate and, every time it increases a number of subject terminal apparatus, transmits measurement data to, or receives them from, the plurality of subject terminal apparatus at a fixed measurement bit rate, and measures the bit rate for each subject terminal apparatus. Then, the controller, in the event that a difference between a tallied bit rate before increasing the number of subject terminal apparatus and a tallied bit rate after increasing the number of subject terminal apparatus is less than or equal to a predetermined value, determines that the tallied bit rate at that time is the communication bandwidth of the measuring terminal apparatus.

8 Claims, 9 Drawing Sheets

U.S. PATENT DOCUMENTS

2006/0168104 A1* 7/2006 Shimizu et al. ............... 709/218
2007/0115804 A1* 5/2007 Hibino ......................... 370/216
2007/0116050 A1* 5/2007 Hibino et al. ................. 370/468
2007/0283043 A1  12/2007 Kiyohara et al.

OTHER PUBLICATIONS

Jun. 21, 2011 Office Action issued in JP Application No. 2007-296025 (with English translation).

* cited by examiner

Fig. 1A

RECEPTION BIT RATE MEASUREMENT TIME

Fig. 1B

TRANSMISSION BIT RATE MEASUREMENT TIME

COMMUNICATION BANDWIDTH MEASUREMENT APPARATUS, RECORDING MEDIUM ON WHICH PROGRAM IS RECORDED, AND METHOD

CROSS-REFERENCE TO RELATED APPLICATION(S)

This application is based on and claims the benefit of priority from Japanese Patent Application No. 2007-296025 filed on Nov. 14, 2007; the entire contents of which are incorporated herein by reference.

BACKGROUND OF THE INVENTION

1. Field of the Invention

The present invention relates to a terminal apparatus, a recording medium on which a program is recorded, and a method which measure a usable communication bandwidth when carrying out a data communication between terminal apparatus, in a communication system in which a plurality of terminal apparatus are connected via a network.

2. Description of the Related Art

With a terminal apparatus connected to a network (a communication network) such as an internet, it can happen that a usable communication bandwidth when carrying out a data communication with another terminal apparatus via the network fluctuates greatly depending on conditions such as an area, a provider and a time. For this reason, the communication bandwidth varies according to the terminal apparatus.

Consequently, in a case of carrying out a communication among a plurality of terminal apparatus, or between a server apparatus and a terminal apparatus, via the network, by measuring a usable communication bandwidth for each terminal apparatus, and carrying out a communication control in accordance with a measurement result, it is possible to realize a low-burden data communication.

For example, with a content distribution system which, by a plurality of terminal apparatus connected via the network transmitting and receiving among themselves content information which each terminal apparatus holds, enables a distribution of the content information (for example, refer to Japanese Unexamined Patent Publication No. 2006-197400), in a case in which moving image content information is streaming distributed from a certain terminal apparatus to another terminal apparatus, it is possible to realize a pleasing moving image distribution by distributing at an image quality suited to the usable communication bandwidth. Specifically, with a terminal apparatus which can select between a moving image distribution of 1 Mbps and a moving image distribution of 100 kbps, in a case in which a usable communication bandwidth of another terminal apparatus, which receives a moving image distribution from the terminal apparatus, is 100 kbps, it is possible to realize a pleasing moving image distribution appropriate to the usable communication bandwidth by selecting a bit rate of 100 kbps.

Figure 8:
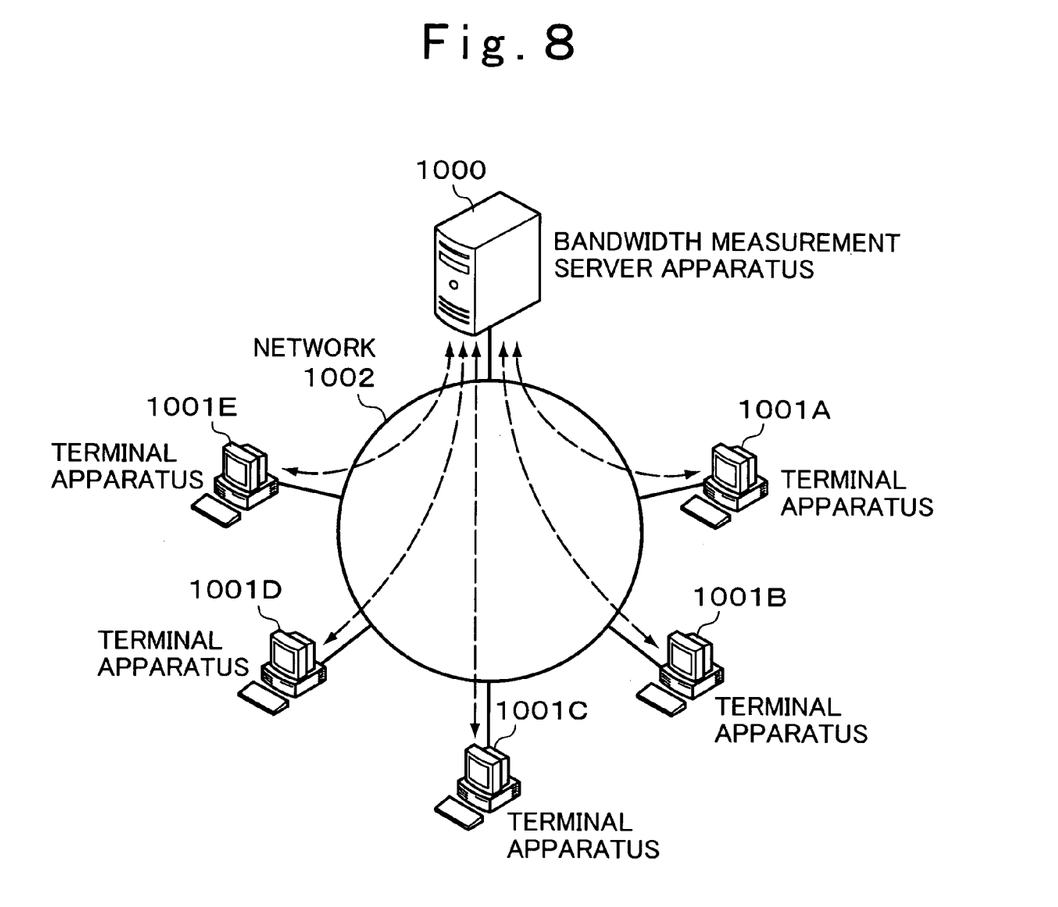
FIG. 8 is a diagram showing a configuration of a heretofore known communication system which measures a communication bandwidth.

Meanwhile, as a method of measuring the communication bandwidth, there is one in which a bandwidth measurement server apparatus is installed in a data center or the like, and the communication bandwidth is measured by carrying out a communication between the bandwidth measurement server apparatus and the terminal apparatus (for example, refer to Non-patent Document "goo speed test", [online], NTT Resonant Inc., [searched for Oct. 25, 2007], Internet<URL:http://speedtest.go.ne.jp/flash.htm>). FIG. 8 is a diagram showing a configuration of a heretofore known communication system which measures a communication bandwidth. The communication system is configured including a plurality of terminal apparatus 1001A to 1001E, and a bandwidth measurement server apparatus 1000, which measures a usable communication bandwidth of each terminal apparatus 1001A to 1001E in a network 1002. Each terminal apparatus 1001A to 1001E, and the bandwidth measurement server apparatus 1000, are connected via the network 1002. With this kind of communication system, the bandwidth measurement server apparatus 1000, by downloading or uploading predetermined measurement data at a predetermined measurement bit rate from or to each terminal apparatus 1001A to 1001E, measures the communication bandwidth for each of the terminal apparatus 1001A to 1001E based on a transmission time or reception time of the data.

SUMMARY OF THE INVENTION

However, as the heretofore known communication bandwidth measurement method is such that the bandwidth measurement server apparatus 1000 measures the communication bandwidth by downloading or uploading the measurement data to or from each terminal apparatus 1001A to 1001E, there is a danger that, in the event that the terminal apparatus 1001A to 1001E start the measurement of the communication bandwidth simultaneously, a huge burden is imposed on the bandwidth measurement server apparatus 1000, and it becomes impossible to correctly measure the communication bandwidth, and the like.

Therein, it is desirable to provide a terminal apparatus, a program, and a method which can correctly measure a communication bandwidth, without providing a server apparatus which measures the communication bandwidth.

According to one aspect of the invention, a terminal apparatus includes a communication section which carries out a communication with another terminal apparatus via a network, a terminal determination section which decides on a plurality of other terminal apparatus as subjects of measurement used for determining a communication bandwidth between the network and the communication section, a measurement bit rate determination section which decides on a measurement bit rate with each measurement subject terminal apparatus, a measurement section which carries out a communication with each measurement subject terminal apparatus, at the measurement bit rate, and measures a bit rate of the communication with each terminal apparatus at that time, and a determination section which tallies measurement bit rates with terminal apparatus, among the plurality of measurement subject terminal apparatus, with which a communication has been possible at the measurement bit rate decided on, and determines the communication bandwidth.

DESCRIPTION OF THE PREFERRED EMBODIMENT(S)

Hereafter, a specific description will be given, with reference to the drawings, of an embodiment of the invention. The embodiment of the invention is such that a communication bandwidth usable when a certain terminal apparatus carries out a communication with another terminal apparatus via a network is measured using a plurality of other terminal apparatus decided on as measurement subjects, rather than being measured using a server apparatus. Specifically, all terminal apparatus participating in the network having a measurement data transmission and reception function, a terminal apparatus which is attempting to measure its own communication bandwidth makes a request to the plurality of other terminal apparatus decided on as the measurement subjects, which are participating in the network, for a transmission or reception of measurement data and, by forwarding or causing to be forwarded the measurement data at a predetermined measurement bit rate, measures a bit rate between itself and each of the plurality of other terminal apparatus which are the measurement subjects, tallies the measured bit rates, and takes the tallied bit rates to be the communication bandwidth.

1. Communication System and Terminal Apparatus Configuration

Figure 1A:
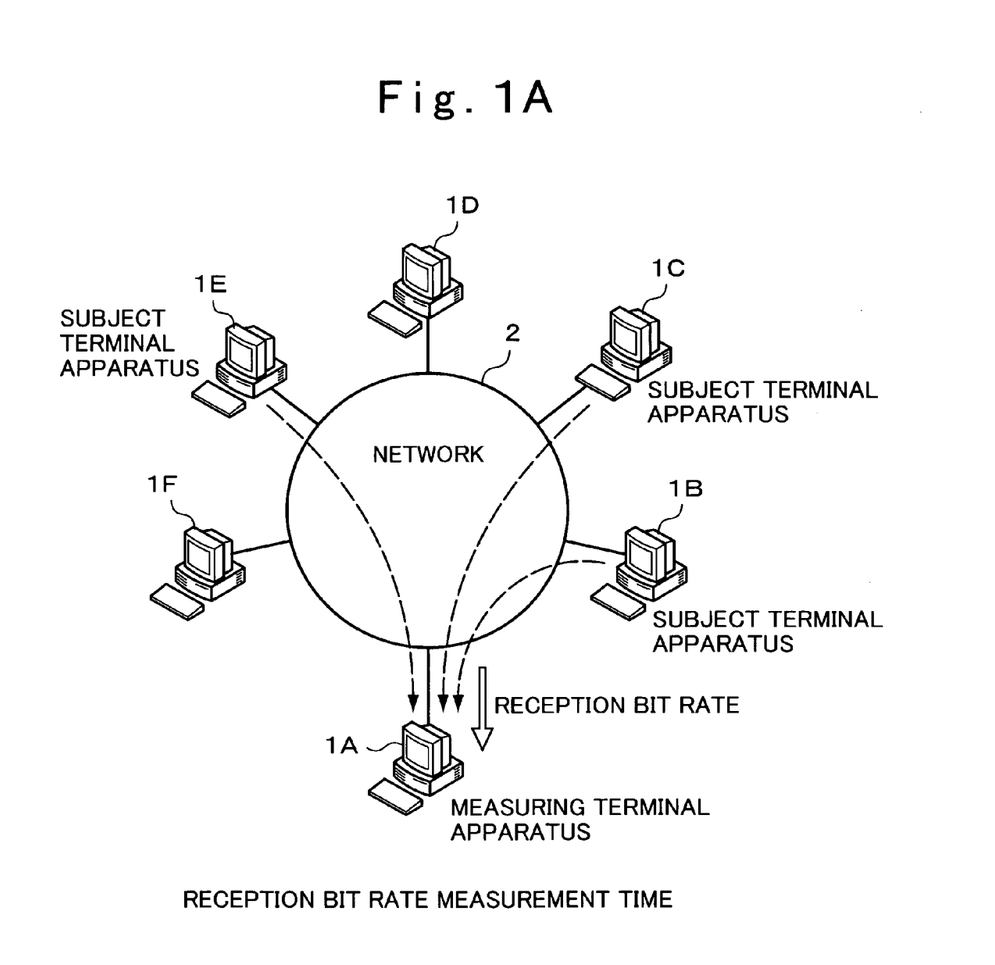
FIG. 1A is a diagram showing a configuration of a communication system including a terminal apparatus according to an embodiment of the invention, and a flow of measurement data when the terminal apparatus measures a reception bit rate.
Figure 1B:
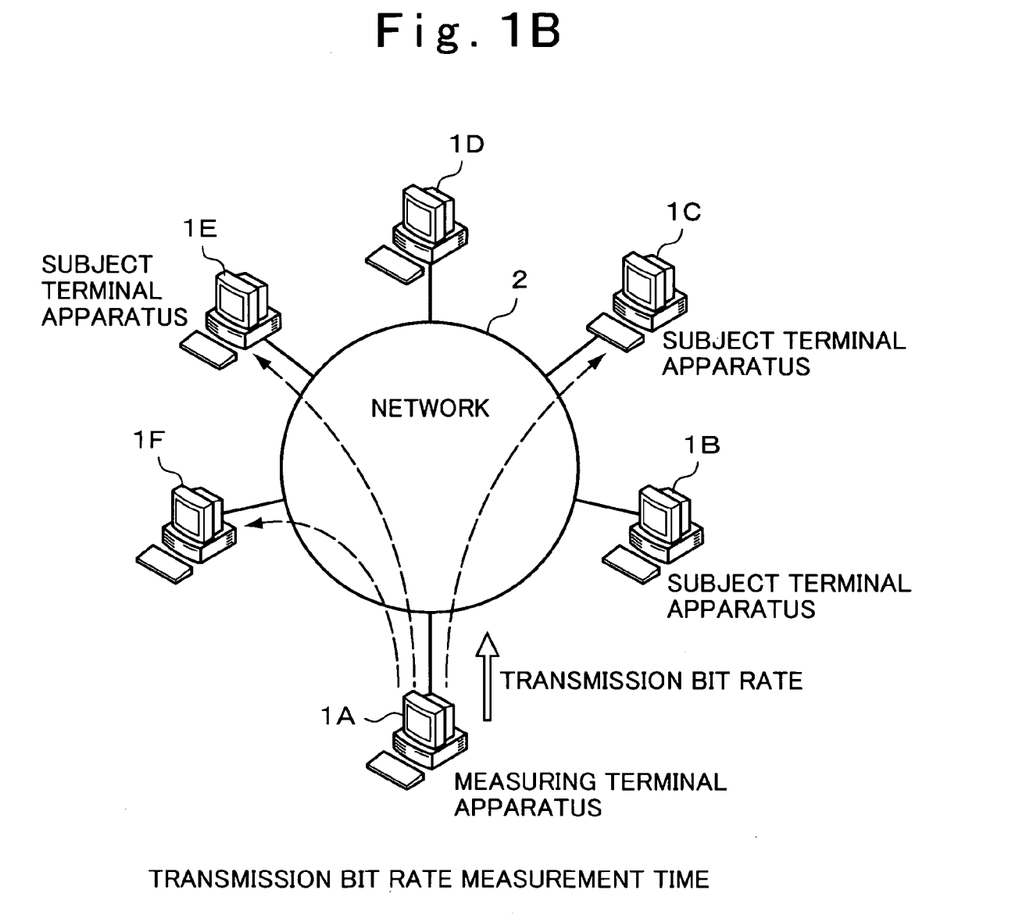
FIG. 1B is a diagram showing the configuration of the communication system including the terminal apparatus according to the embodiment of the invention, and a flow of measurement data when the terminal apparatus measures a transmission bit rate.
Figure 2:
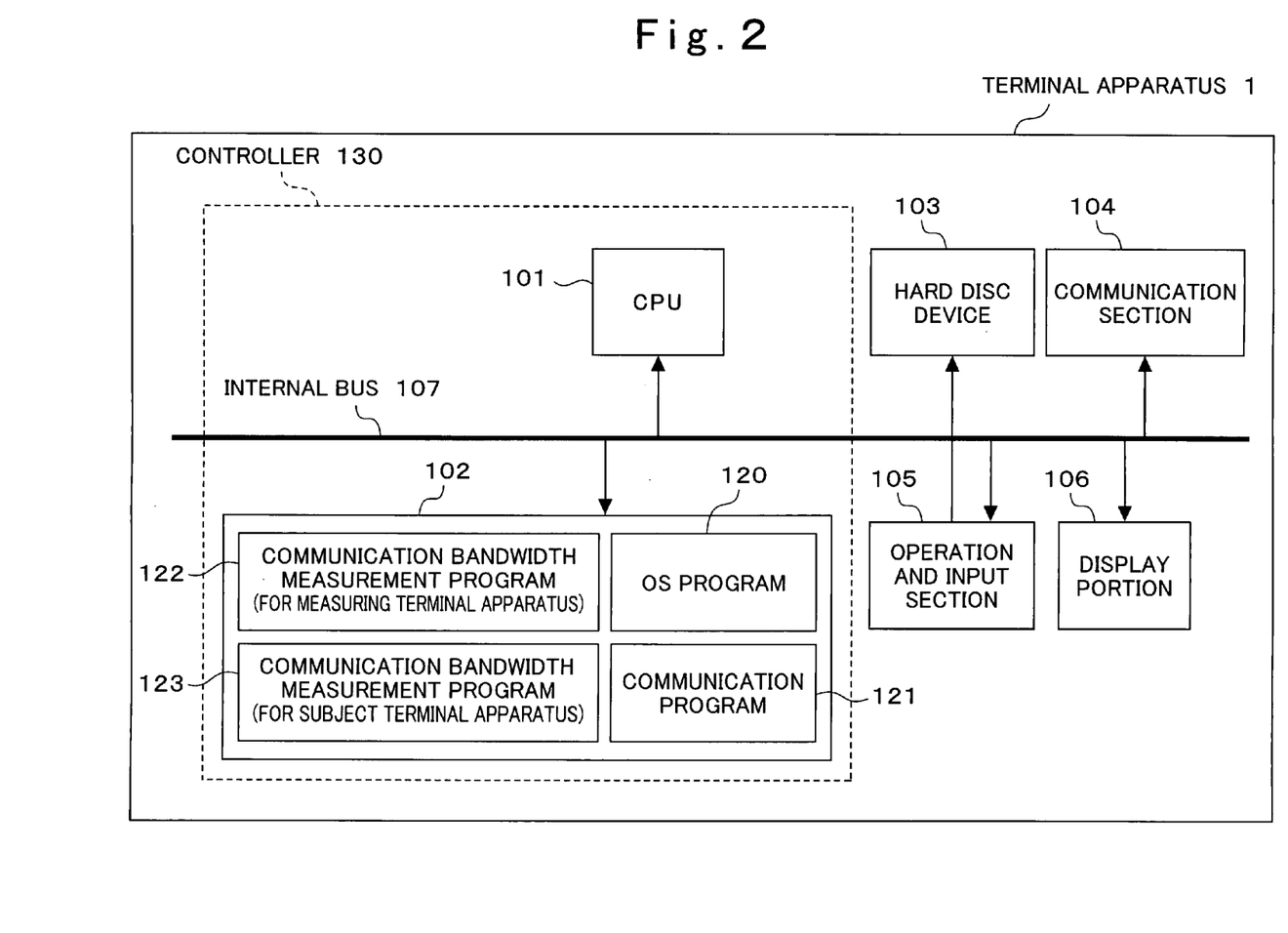
FIG. 2 is a diagram showing a configuration of the terminal apparatus.

Firstly, a description will be given of a configuration of a communication system including a terminal apparatus, and of the terminal apparatus, according to the embodiment. FIG. 1A shows the configuration of the communication system, and a flow of measurement data when a terminal apparatus measures a reception bit rate, while FIG. 1B shows the configuration of the communication system, and a flow of measurement data when the terminal apparatus measures a transmission bit rate. Also, FIG. 2 is a diagram showing a configuration of the terminal apparatus of FIGS. 1A and 1B.

1.1 Communication System

Firstly, a description will be given of the configuration of the communication system. Referring to FIGS. 1A and 1B, the communication system is configured including a plurality of terminal apparatus 1A to 1F, which carry out a mutual communication via a network 2. For example, it is acceptable that the communication system is a tree type content distribution system which connects the plurality of terminal apparatus 1A to 1F in the network 2, which is a tree-shaped hierarchical structure, with a content distribution apparatus (not shown) distributing content information as an apex, and enables a distribution of content information from the content distribution apparatus to the terminal apparatus 1A to 1F. It is also acceptable that it is a content distribution system which enables a distribution of content information by content information held by each terminal apparatus 1A to 1F being mutually transmitted and received among the plurality of terminal apparatus 1A to 1F connected via the network 2. Hereafter, in a case of referring to terminal apparatus in general, or in a case of referring to an individual terminal apparatus, a simple "terminal apparatus 1" will be used.

Referring to FIGS. 1A and 1B, in a case in which the terminal apparatus 1A measures its own usable communication bandwidth, the terminal apparatus 1A will be referred to hereafter as a measuring terminal apparatus. Also, cooperating terminal apparatus 1B, 1C and 1E, which transmit and receive measurement data when the measuring terminal apparatus 1A measures its own usable communication bandwidth, will be referred to as subject terminal apparatus (terminal apparatus which are subjects of measurement).

In FIG. 1A, the measuring terminal apparatus 1A decides on the subject terminal apparatus 1B, 1C and 1E which are to transmit measurement data addressed to the measuring terminal apparatus 1A itself, and on a measurement bit rate when transmitting the measurement data, transmits a measurement data transmission request to the subject terminal apparatus 1B, 1C and 1E and, by receiving the measurement data transmitted at the measurement bit rate from the subject terminal apparatus 1B, 1C and 1E, measures a reception bit rate for each of the subject terminal apparatus 1B, 1C and 1E. Then, it determines the communication bandwidth by tallying the measured reception bit rates.

Also, in FIG. 1B, the measuring terminal apparatus 1A decides on the subject terminal apparatus 1B, 1C and 1E which are to receive measurement data from the measuring terminal apparatus 1A itself, and on a measurement bit rate when transmitting the measurement data, transmits a measurement data reception request to the subject terminal apparatus 1B, 1C and 1E and, by transmitting the measurement data at the measurement bit rate, measures a transmission bit rate for each of the subject terminal apparatus 1B, 1C and 1E. Then, it determines the communication bandwidth by tallying the measured transmission bit rates.

1.2 Terminal Apparatus

Next, a description will be given of the configuration of the terminal apparatus. Referring to FIG. 2, the terminal apparatus 1, a general personal computer being applicable, is configured including a CPU (Central Processing Unit) 101, a rewritable memory 102, which temporarily stores various kinds of program, table and the like, a hard disc device 103, which stores various kinds of program, table and the like, a communication section 104 for carrying out a communication with another terminal apparatus 1 via the network 2, an operation and input section 105, which carries out a control for inputting data by means of a user operating a mouse, a keyboard or the like (not shown), and a display section 106, which carries out a control for accepting display data from the CPU 101, and displaying the display data on a display (not shown). These various kinds of constituent element are mutually connected via an internal bus 107. Also, a controller 130 is configured of the CPU 101 and the memory 102.

Memory

An OS (Operating System) program 120, which provides basic functions of the terminal apparatus 1 as a computer, a communication program 121, which carries out a communication with another terminal apparatus 1, by way of the network 2, via the communication section 104, a communication bandwidth measurement program (for a measuring terminal apparatus) 122, which carries out a process transmitting or receiving measurement data, or the like, in order to measure a communication bandwidth usable by the terminal apparatus 1 itself, a communication bandwidth measurement program (for a subject terminal apparatus) 123 which, when another terminal apparatus 1 measures a usable communication bandwidth as the measuring terminal apparatus 1, carries out a predetermined process in response to a request for a transmission or reception of measurement data, or the like, from the measurement terminal apparatus 1, and the like, are stored in the memory 102.

Herein, the OS program 120, by being retrieved and executed by the CPU 101, realizes a function relating to a memory management of the memory 102 and the hard disc device 103, a function relating to a communication control of the communication section 104 using the communication program 121, a function relating to an input control of the operation and input section 105, a function relating to a display control of the display section 106, and the like, as basic functions of the computer.

It is acceptable to arrange in such a way that the OS program 120, the communication program 121, the communication bandwidth measurement program (for the measuring terminal apparatus) 122, the communication bandwidth measurement program (for the subject terminal apparatus) 123, and the like are, for example, downloaded into the hard disc device 103, via the communication section 104, from a server apparatus or the like connected to the network 2, and it is also acceptable that, after being recorded on a recording medium such as a CD-ROM, they are uploaded into the hard disc device 103, via the recording medium. By so doing, the OS program 120 etc. downloaded or uploaded into the hard disc device 103 are retrieved into the memory 102 by the CPU 101.

Controller

The controller 130, being configured, as previously described, of the CPU 101 and the memory 102, centrally controls a whole of the terminal apparatus 1 by the CPU 101 retrieving into the memory 102 and executing each kind of program 120 to 123, and the like, stored in the hard disc device 103.

Herein, the controller 130, using the communication bandwidth measurement program (for the measuring terminal apparatus) 122 and the communication program 121, functions as a communication section which carries out a communication with another terminal apparatus 1 via the network 2. Also, the controller 130, using the communication bandwidth measurement program (for the measuring terminal apparatus) 122, functions as a terminal determining section which decides on a plurality of other subject terminal apparatus 1 as measurement subjects used for determining a communication bandwidth between the network 2 and the communication section, and functions as a measurement bit rate determining section which decides on a measurement bit rate with the subject terminal apparatus 1. Also, the controller 130, using the communication bandwidth measurement program (for the measuring terminal apparatus) 122 and the communication program 121, functions as a measurement section which carries out a communication with each subject terminal apparatus 1 at the measurement bit rate, and measures a bit rate of the communication with the subject terminal apparatus 1 at that time. Also, the controller 130, using the communication bandwidth measurement program (for the measuring terminal apparatus) 122, functions as a determination section which tallies measurement bit rates with subject terminal apparatus 1, among the subject terminal apparatus 1, with which a communication has been possible at the measurement bit rate, and determines a communication bandwidth, and functions as a storage section, which stores the bit rate with each subject terminal apparatus 1, measured by the measurement section, for each subject terminal apparatus 1, and stores the communication bandwidth determined by the determination section. Also, in the case in which the communication system is the kind of tree type content distribution system, when joining the network 2, the controller 130 determines the communication bandwidth as the determination section, and furthermore functions as a section which connects to a downstream terminal apparatus, connected in the tree-shaped hierarchical structure, based on the determined communication bandwidth.

Also, the controller 130, using the communication bandwidth measurement program (for the subject terminal apparatus) 123 and the communication program 121, functions as a section which transmits or receives measurement data at the measurement bit rate, and functions as a section which, when the measuring terminal apparatus 1 decides on the subject terminal apparatus 1, retrieves necessary bit rate information from the storage section in response to a request from the measuring terminal apparatus 1, and transmits it to the measuring terminal apparatus 1.

2. Terminal Apparatus Processes

Next, a description will be given of processes of the terminal apparatus. The processes of the terminal apparatus 1 are separated into a process in the case of operating as the measuring terminal apparatus 1, and a process in the case of operating as the subject terminal apparatus 1. Hereafter, a description will be given of each process.

2.1 Measuring Terminal Apparatus Process

Figure 3:
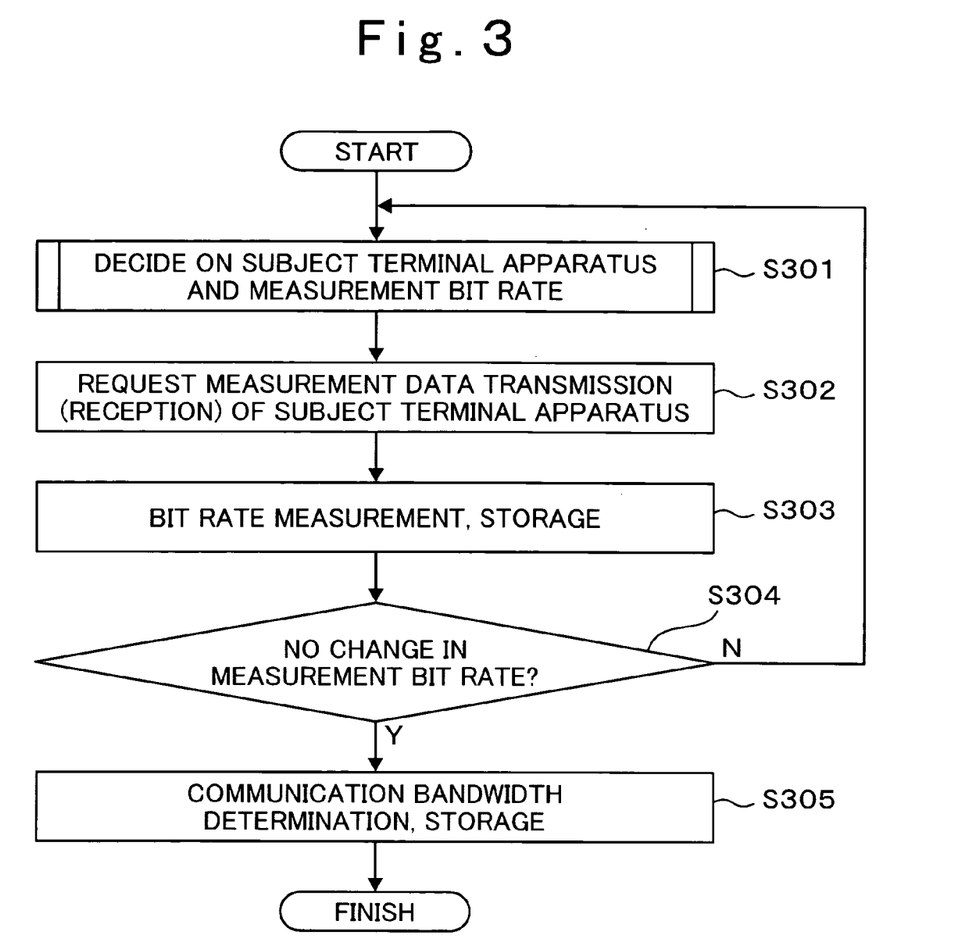
FIG. 3 is a diagram showing a flow of a communication bandwidth measurement process (for a measuring terminal apparatus)

Firstly, a description will be given of the process in the case of operating as the measuring terminal apparatus 1. FIG. 3 is a diagram showing a flow of a communication bandwidth measurement process, in the case of the terminal apparatus 1 operating as the measuring terminal apparatus 1. The communication bandwidth measurement process is realized using the communication program 121 and the communication bandwidth measurement program (for the measuring terminal apparatus) 122.

In FIG. 3, when the terminal apparatus 1 newly joins the network 2 (or regularly after joining), on starting a process of measuring its own communication bandwidth, the controller 130 of the terminal apparatus 1 decides on other terminal apparatus 1 as subjects of measurement, and on a measurement bit rate (step S301).

For example, in the previously described tree type content distribution system, the measuring terminal apparatus 1, when newly joining the network 2, transmits a message to an introduction server (not shown in FIGS. 1(1) and 1(2)) regarding a measuring of the communication bandwidth. The introduction server apparatus which receives the message randomly designates terminal apparatus 1, from among a plurality of terminal apparatus 1 participating in the tree type content distribution system, and transmits information on the designated terminal apparatus 1 to the measuring terminal apparatus 1. Then, the measuring terminal apparatus 1, on receiving the information on the terminal apparatus 1 from the introduction server apparatus, decides on the terminal apparatus 1 designated by the introduction server apparatus as the subject terminal apparatus 1. In this way, the measuring terminal apparatus 1 decides on a plurality of subject terminal apparatus 1.

Herein, the introduction server apparatus, being an apparatus which introduces connection candidates to a terminal apparatus 1 newly joining the network 2, stores information such as a node number and an IP address of all terminal apparatus 1 connected to the tree-shaped hierarchical structure.

Also, for example, in the previously described content distribution system in which the plurality of terminal apparatus 1 transmit and receive the content information each of them holds, the measuring terminal apparatus 1, when newly joining the network 2, or regularly after joining, randomly decides on an ID specifying the terminal apparatus 1 and, using a DHT (Distributed Hash Table) which it holds, transmits a query regarding the ID. The query is forwarded by the terminal apparatus 1 which receives the query, using a DHT which it holds. Then, in the event that the query ultimately arrives at the terminal apparatus 1 with that ID, the terminal apparatus 1 with the ID transmits the fact that it has received the query to the measuring terminal apparatus 1. The measuring terminal apparatus 1, on receiving the fact that the query has been received, decides on the terminal apparatus 1 with that ID as the subject terminal apparatus 1. In this way, the measuring terminal apparatus 1 decides on a plurality of subject terminal apparatus 1.

Herein, the DHT, in accordance with predetermined rules, divides the terminal apparatus 1 participating in the content distribution system into a plurality of groups, taking the groups to be level one groups, further divides a group, among the level one groups, to which its own terminal apparatus 1 belongs into a plurality of groups, taking each group to be a level two group, makes groups up to a level n (n is a positive integer) using the same group division as the level two group division, and stores location information, such as an ID, for one terminal apparatus 1 belonging to each group at each stage (except for the group to which its own terminal apparatus 1 belongs). Each terminal apparatus 1 carries out a forwarding of a message, such as a query, using the DHT. In this kind of content distribution system, it is also acceptable to arrange in such a way that the measuring terminal apparatus 1 randomly selects an ID from among ID and the like stored in the DHT, and decides on the terminal apparatus 1 with the selected ID as the subject terminal apparatus 1.

It may happen that the process of step S301 is executed a plurality of times in accordance with conditions of step S304, to be described hereafter. With the process of step S301, there are, for example, a case in which the measurement bit rate is fixed, and the subject terminal apparatus 1 are increased every time bit rates are measured, a case in which a predetermined number of subject terminal apparatus 1 is fixed, and the measurement bit rate is increased every time bit rates are measured, and a case in which the subject terminal apparatus 1, and the measurement bit rate for a first bit rate measurement, are decided based on bit rate information stored in advance, and the subject terminal apparatus 1 are increased every time bit rates are measured. Details of these processes will be described hereafter.

The controller 130, in accordance with predetermined settings, transmits to the subject terminal apparatus 1 decided on in step S301 a request for a transmission, or a request for a reception, of measurement data, including information such as a measurement starting time, a measurement time, and the measurement bit rate decided on in step S301 (step S302). Herein, it being set in advance whether the controller 130 is to transmit either a measurement data transmission request or a reception request, in a case of transmitting a measurement data transmission request, a communication bandwidth is determined by measuring received bit rates, as shown in FIG. 1A. Meanwhile, in a case of transmitting a measurement data reception request, a communication bandwidth is determined by measuring transmitted bit rates, as shown in FIG. 1B. Also, the measurement starting time refers to a time at which the process is actually started, while the measurement time refers to a length of a process time. Also, it may happen that the measurement bit rate is not transmitted, in which case a preset fixed transmission bit rate is used. Processes of the subject terminal apparatus 1 which receive the request for a transmission, or the request for a reception, of measurement data, including the information such as the measurement starting time, the measurement time, and the measurement bit rate, will be described hereafter.

The controller 130, in the case of transmitting the measurement data transmission request in step S302, receives measurement data transmitted at the measurement bit rate from each of the plurality of subject terminal apparatus 1, which are transmission destinations, measures each reception bit rate, and stores the measured reception bit rate for each subject terminal apparatus 1 in a bit rate information table storage section (step S303). In the event that the received bit rate is already stored, it is overwritten. For example, in a case in which it has been possible to receive measurement data at a measurement bit rate of 200 kbps from each of three subject terminal apparatus 1, the reception bit rate measured for each of the three subject terminal apparatus 1 being 200 kbps in each case, the reception bit rate is stored for each subject terminal apparatus 1. Also, in a case in which it has been possible to receive measurement data at a measurement bit rate of 200 kbps from each of two subject terminal apparatus 1, among the three subject terminal apparatus 1, but it has not been possible to receive it from the other one subject terminal apparatus 1, 200 kbps is stored for each of the two subject terminal apparatus 1, and 0 kbps is stored for the one subject terminal apparatus 1. Meanwhile, in the case of transmitting the measurement data reception request, the controller 130 transmits measurement data to each of the plurality of subject terminal apparatus 1, which are the transmission destinations, measures a transmission bit rate at the time, and stores it in the bit rate information table storage section.

The controller 130 tallies the bit rates measured in step S302, compares the tallied bit rate with a previous tallied bit rate, and determines whether or not there is any change in the tallied bit rate, that is, determines whether or not a difference between the tallied bit rates is less than or equal to a predetermined value (step S304).

If the controller 130 determines that the difference between the tallied bit rates is less than or equal to the predetermined value (step S304:Y), that is, if it determines that the tallied bit rate has not increased, it decides on the tallied bit rate on this occasion as the communication bandwidth, and stores the communication bandwidth bit rate in the bit rate information table storage section. Meanwhile, if the controller 130 determines that the difference between the tallied bit rates is not less than or equal to the predetermined value (step S304:N), that is, if it determines that the tallied bit rate has increased, it shifts to step S301. As no previous tallied bit rate exists in a first time process, the controller 130 shifts to step S301.

Then, if the controller 130 determines in step S304 that the difference between the tallied bit rates is not less than or equal to the predetermined value, by increasing the number of subject terminal apparatus 1 or the measurement bit rate in step S301, the controller 130 decides again on the subject terminal apparatus 1 and measurement bit rate. For example, with regard to the subject terminal apparatus 1, the controller 130 increases the number of subject terminal apparatus 1 by one, and decides on the new one subject terminal apparatus 1. Also, for example, with regard to the measurement bit rate, the controller 130 decides on the measurement bit rate in such a way that it increases in units of 100 kbps from 100 kbps to 1 Mbps. Then, the controller 130, after the process of step S302, measures and stores the bit rates in step S303, and once more, in step S304, carries out the process comparing the tallied bit rate on this occasion and the immediately preceding tallied bit rate. The controller 130 repeats this kind of process until the difference between the tallied bit rates is less than or equal to the predetermined value.

For example, at a time when the tallied bit rate is 400 kbps in a case of deciding on four subject terminal apparatus 1 and a measurement bit rate of 100 kbps, and the tallied bit rate is 400 kbps in a case of deciding on five subject terminal apparatus 1 and a measurement bit rate of 100 kbps, the controller 130 determines in step S304 that the difference between the tallied bit rates is less than or equal to the predetermined value, and in step S305, stores the tallied bit rate on this occasion as being the communication bandwidth. In this case, it is taken that the measuring terminal apparatus 1, having a communication bandwidth of at least 400 kbps, does not have a communication bandwidth of 500 kbps.

First Subject Terminal Apparatus and Measurement Bit Rate Determination Process

Figure 4:
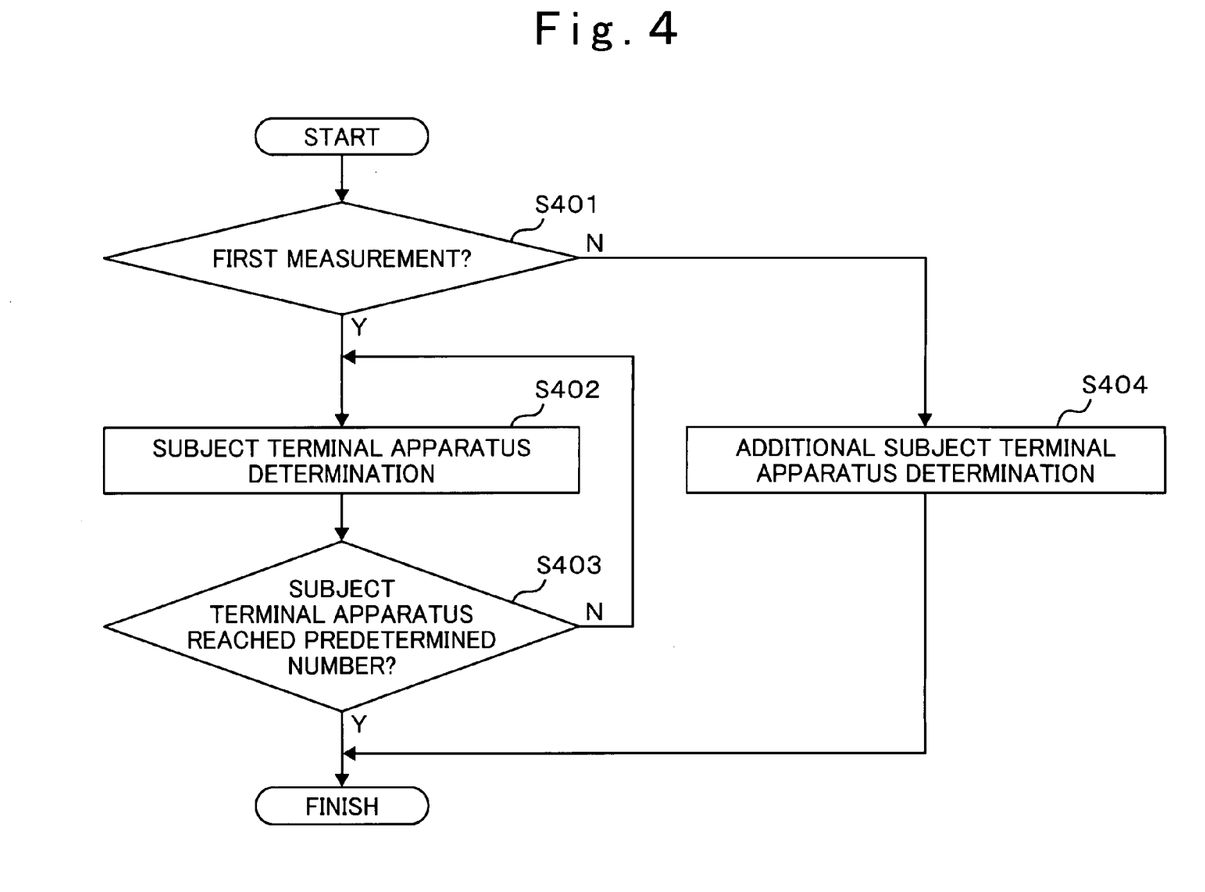
FIG. 4 is a diagram showing a first flow of a subject terminal apparatus and communication bit rate determination process.

Next, a detailed description will be given of the first process in step S301, shown in FIG. 3. FIG. 4 is a diagram showing a flow of the first process. The first subject terminal apparatus 1 and measurement bit rate determination process is one which fixes the measurement bit rate, and increases the subject terminal apparatus 1 every time bit rates are measured.

Referring to FIG. 4, the controller 130 of the terminal apparatus 1, firstly, determines whether or not the bit rates have been measured for the first time in step S301 of FIG. 3 (step S401). If it determines that it is the first time the bit rates have been measured (step S401:Y), the controller 130 decides on the subject terminal apparatus 1 to be the subjects of measurement (step S402). Then, the controller 130 determines whether or not the number of the subject terminal apparatus 1 decided on in step S402 has reached a predetermined number (step S403) and, if it determines that it has reached the predetermined number (step S403:Y), finishes the process, and carries out the process of step S302 of FIG. 3. Meanwhile, if the controller 130 determines that the predetermined number has not been reached (step S403:N), it shifts to step S402, decides on new subject terminal apparatus 1, and shifts to step S403. In this way, the controller 130 adds new subject terminal apparatus 1 until the subject terminal apparatus 1 reach the predetermined number.

Meanwhile, if the controller 130 determines in step S401 that it is not the first time the bit rates have been measured (step S401:N), that is, if the process has shifted from step S304 in FIG. 3, the controller 130 decides on new subject terminal apparatus 1 to be added (step S404), finishes the process, and carries out the process of step S302 of FIG. 3.

In the above way, according to the embodiment of the invention, the controller 130 of the measuring terminal apparatus 1, by fixing the measurement bit rate and, every time it increases the number of subject terminal apparatus 1, transmitting measurement data to, or receiving them from, the subject terminal apparatus 1 at the fixed measurement bit rate, measures the bit rates, and determines the communication bandwidth. That is, the controller 130 of the measuring terminal apparatus 1 measures the bit rate of each subject terminal apparatus 1, and tallies the measured bit rates. Then, by carrying out this kind of measurement and tallying twice or more, in the event that the difference between the tallied bit rate before increasing the number of subject terminal apparatus 1 and the tallied bit rate after increasing the number of subject terminal apparatus 1 is less than or equal to the predetermined value, the controller 130 determines that the tallied bit rate after the increase is the communication bandwidth. This means that, even when increasing the subject terminal apparatus 1 which transmit or receive measurement data at the fixed measurement bit rate, as the tallied bit rate is saturated in the event that there is no change in the tallied bit rate, the measuring terminal apparatus 1 has a communication bandwidth of at least the tallied bit rate. Consequently, it is possible to correctly determine the communication bandwidth, without providing a server apparatus for measuring the communication bandwidth. Also, as it has been arranged in such a way that the measuring terminal apparatus 1 transmits measurement data to, or receives them from, a plurality of subject terminal apparatus 1 at the fixed measurement bit rate, tallies the measured bit rates, and determines the communication bandwidth, it does not happen that each terminal apparatus 1, when transmitting or receiving measurement data, needs a broad bandwidth.

Figure 5:
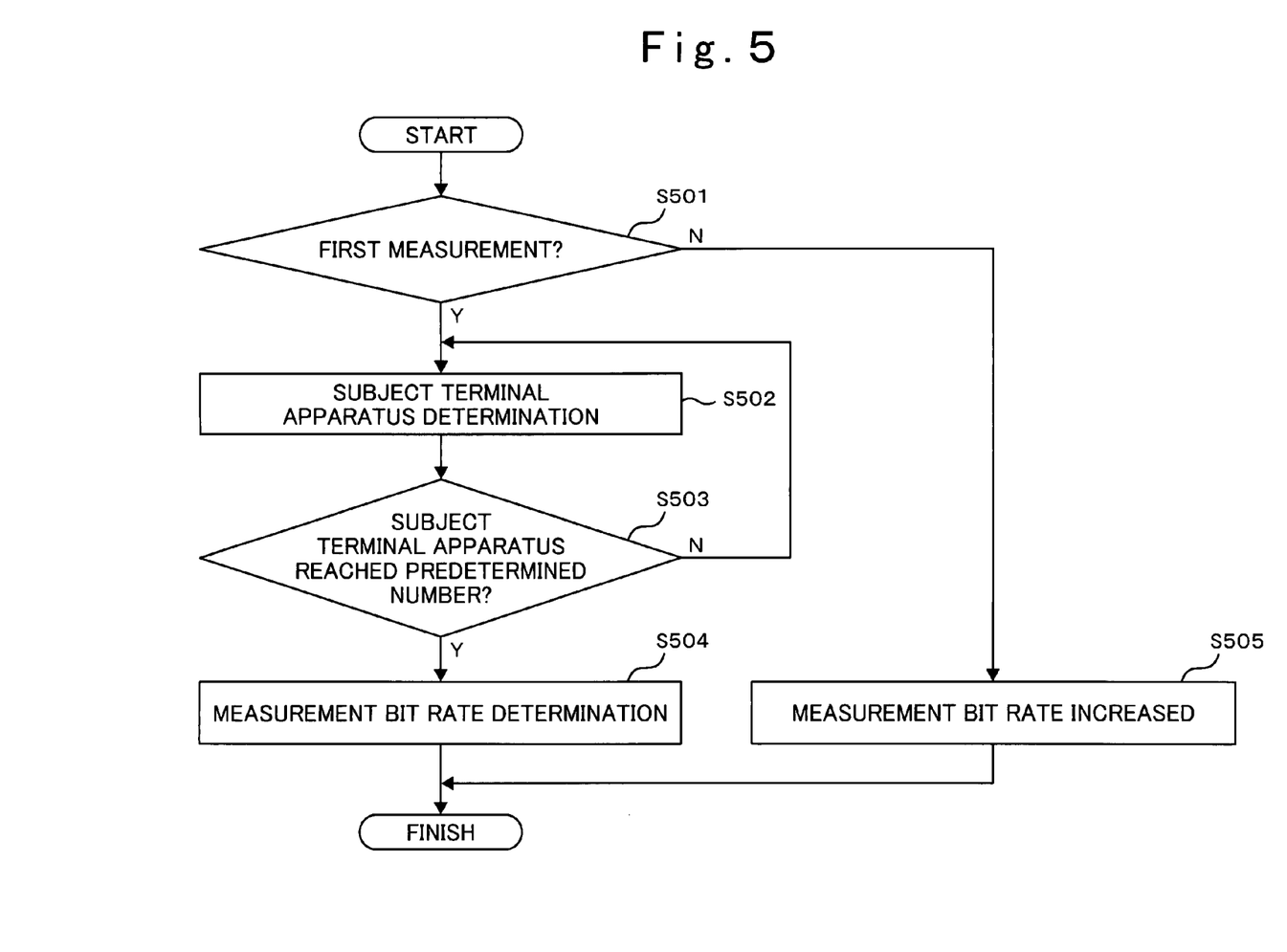
FIG. 5 is a diagram showing a second flow of the subject terminal apparatus and communication bit rate determination process.

Second Subject Terminal Apparatus and Measurement Bit Rate Determination Process Next, a detailed description will be given of the second process in step S301, shown in FIG. 3. FIG. 5 is a diagram showing a flow of the second process. The second subject terminal apparatus 1 and measurement bit rate determination process is one which fixes a predetermined number of subject terminal apparatus 1, and increases the measurement bit rate every time bit rates are measured.

Referring to FIG. 5, the controller 130 of the terminal apparatus 1, firstly, determines whether or not the bit rates have been measured for the first time in step S301 of FIG. 3 (step S501). If it determines that it is the first time the bit rates have been measured (step S501:Y), the controller 130 decides on the subject terminal apparatus 1 to be the subjects of measurement (step S502). Then, the controller 130 determines whether or not the number of the subject terminal apparatus 1 decided on in step S502 has reached a predetermined number (step S503) and, if it determines that it has reached the predetermined number (step S503:Y), decides on the measurement bit rate (step S504), finishes the process, and carries out the process of step S302 of FIG. 3. Herein, the controller 130, in step S504, decides on a measurement bit rate of, for example, 100 kbps. Meanwhile, if the controller 130 determines that the predetermined number has not been reached (step S503:N), it shifts to step S502, decides on new subject terminal apparatus 1, and shifts to step S503. In this way, the controller 130 adds new subject terminal apparatus 1 until the subject terminal apparatus 1 reach the predetermined number.

Meanwhile, if the controller 130 determines in step S501 that it is not the first time the bit rates have been measured (step S501:N), that is, if the process has shifted from step S304 in FIG. 3, the controller 130 decides on a new measurement bit rate wherein the bit rate of 100 kbps has been increased (step S505), finishes the process, and carries out the process of step S302 of FIG. 3.

In the above way, according to the embodiment of the invention, the controller 130 of the measuring terminal apparatus 1, by fixing the predetermined number of subject terminal apparatus 1 and, every time it increases the measurement bit rate, transmitting measurement data to, or receiving them from, the fixed subject terminal apparatus 1, measures the bit rates, and determines the communication bandwidth. That is, the controller 130 of the measuring terminal apparatus 1 measures the bit rate of each subject terminal apparatus 1, and tallies the measured bit rates. Then, by carrying out this kind of measurement and tallying twice or more, in the event that the difference between the tallied bit rate before increasing the measurement bit rate and the tallied bit rate after increasing the measurement bit rate is less than or equal to the predetermined value, the controller 130 determines that the tallied bit rate after the increase is the communication bandwidth. This means that, even when increasing the measurement bit rate of the measurement data, as the tallied bit rate is saturated in the event that there is no change in the tallied bit rate, the measuring terminal apparatus 1 has a communication bandwidth of at least the tallied bit rate. Consequently, it is possible to correctly determine the communication bandwidth, without providing a server apparatus for measuring the communication bandwidth. Also, as it has been arranged in such a way that the measuring terminal apparatus 1 transmits measurement data to, or receives them from, a fixed plurality of subject terminal apparatus 1 at a predetermined measurement bit rate, tallies the measured bit rates, and determines the communication bandwidth, it does not happen that each terminal apparatus 1, when transmitting or receiving measurement data, needs a broad bandwidth.

Third Subject Terminal Apparatus and Measurement Bit Rate Determination Process

Figure 6:
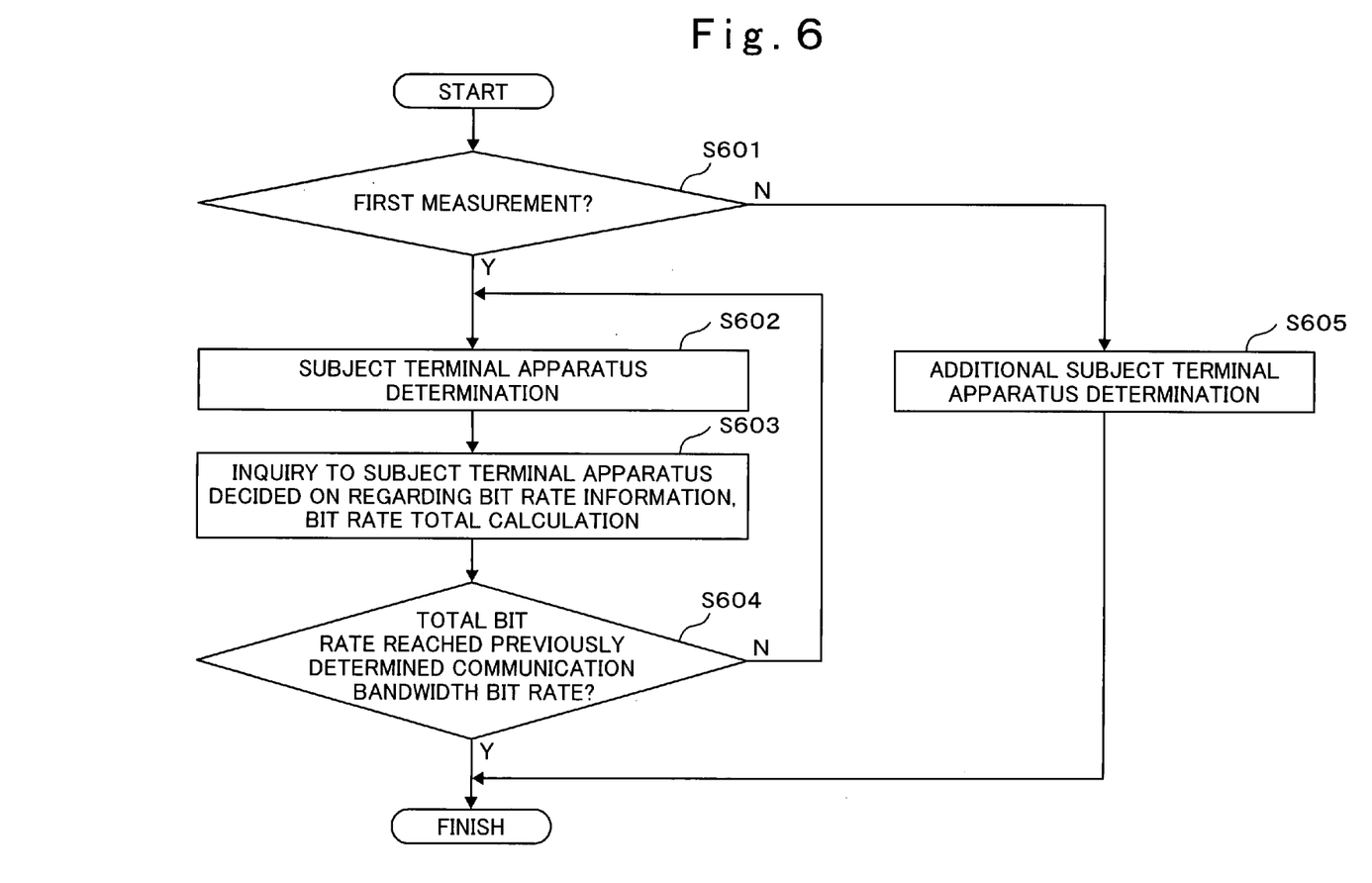
FIG. 6 is a diagram showing a third flow of the subject terminal apparatus and communication bit rate determination process.

Next, a detailed description will be given of the third process in step S301, shown in FIG. 3. FIG. 6 is a diagram showing a flow of the third process. The third subject terminal apparatus 1 and measurement bit rate determination process is one which determines the subject terminal apparatus 1 and measurement bit rate for the first bit rate measurement based on bit rate information stored in advance in the bit rate information storage section, and increases the subject terminal apparatus 1 every time bit rates are measured.

The communication bandwidth in the case in which the terminal apparatus 1 operates as the measuring terminal apparatus 1, determined in step S305 of FIG. 3, is stored in the bit rate information storage section.

Returning to FIG. 6, the controller 130 of the terminal apparatus 1, firstly, determines whether or not the bit rates have been measured for the first time in step S301 of FIG. 3 (step S601). If it determines that it is the first time the bit rates have been measured (step S601:Y), the controller 130 decides on the subject terminal apparatus 1 to be the subjects of measurement (step S602).

The controller 130, by making an inquiry to the subject terminal apparatus 1 decided on in step S602, acquires bit rate information of the relevant terminal apparatus 1, and calculates a new total bit rate by adding together a previously calculated total bit rate and the bit rate information acquired on this occasion (step S603). Specifically, for example, in a case in which the measuring terminal apparatus 1 is the terminal apparatus 1A, and the subject terminal apparatus 1 is the terminal apparatus 1B, the controller 130 of the measuring terminal apparatus 1A transmits a bit rate information acquisition request to the subject terminal apparatus 1B. The subject terminal apparatus 1B, on receiving the bit rate information inquiry, retrieves the bit rate from the bit rate information storage section which the subject terminal apparatus 1B is holding, and transmits the bit rate to the measuring terminal apparatus 1A. A description of details of processes of the subject terminal apparatus 1B will be given hereafter. This means that the controller 130 of the measuring terminal apparatus 1A can acquire the bit rate from the subject terminal apparatus 1B.

Then, the controller 130 retrieves the communication bandwidth (the previously determined communication bandwidth) from the bit rate information storage section, and determines whether or not the total bit rate totaled in step S603 has reached the bit rate of the previously determined communication bandwidth (step S604). If it determines that the total bit rate has reached the bit rate of the previously determined communication bandwidth (step S604:Y), the controller 130 finishes the process, and carries out the process of step S302 of FIG. 3. In this case, the subject terminal apparatus 1 in step S301 of FIG. 3 are the subject terminal apparatus 1 decided on in step S602.

Meanwhile, if the controller 130 determines in step S604 that the total bit rate has not reached the bit rate of the previously determined communication bandwidth (step S604:N), it shifts to step S602, decides on new subject terminal apparatus 1, shifts to step S603, acquires bit rate information from the new subject terminal apparatus 1, calculates a total bit rate by adding together a previously calculated total bit rate and the bit rate information acquired on this occasion, and shifts to step S604. In this way, the controller 130 adds new subject terminal apparatus 1 until the total bit rate reaches the bit rate of the previously determined communication bandwidth. In the event that no bit rate of a previously determined communication bandwidth exists, a preset predetermined bit rate is used.

Meanwhile, if the controller 130 determines in step S601 that it is not the first time the bit rates have been measured (step S601:N), that is, if the process has shifted from step S304 in FIG. 3, the controller 130 decides on new subject terminal apparatus 1 to be added (step S605), finishes the process, and carries out the process of step S302 of FIG. 3. In this case, the subject terminal apparatus 1 in step S301 of FIG. 3 are the subject terminal apparatus 1 decided on in step S602, and the subject terminal apparatus 1 added in step S605.

In the above way, according to the embodiment of the invention, the controller 130 of the measuring terminal apparatus 1, using a record of a bit rate measured in the past for each subject terminal apparatus 1, and a record of a communication bandwidth determined in the past for the measuring terminal apparatus 1, decides on subject terminal apparatus 1 and a measurement bit rate for measuring a first time bit rate. This means that, as it is possible to make the measurement bit rate used the first time conform to a past record, it is possible to reduce a time taken to determine the communication bandwidth, and possible to realize an efficient process.

2.2 Subject Terminal Apparatus Processes

Figure 7:
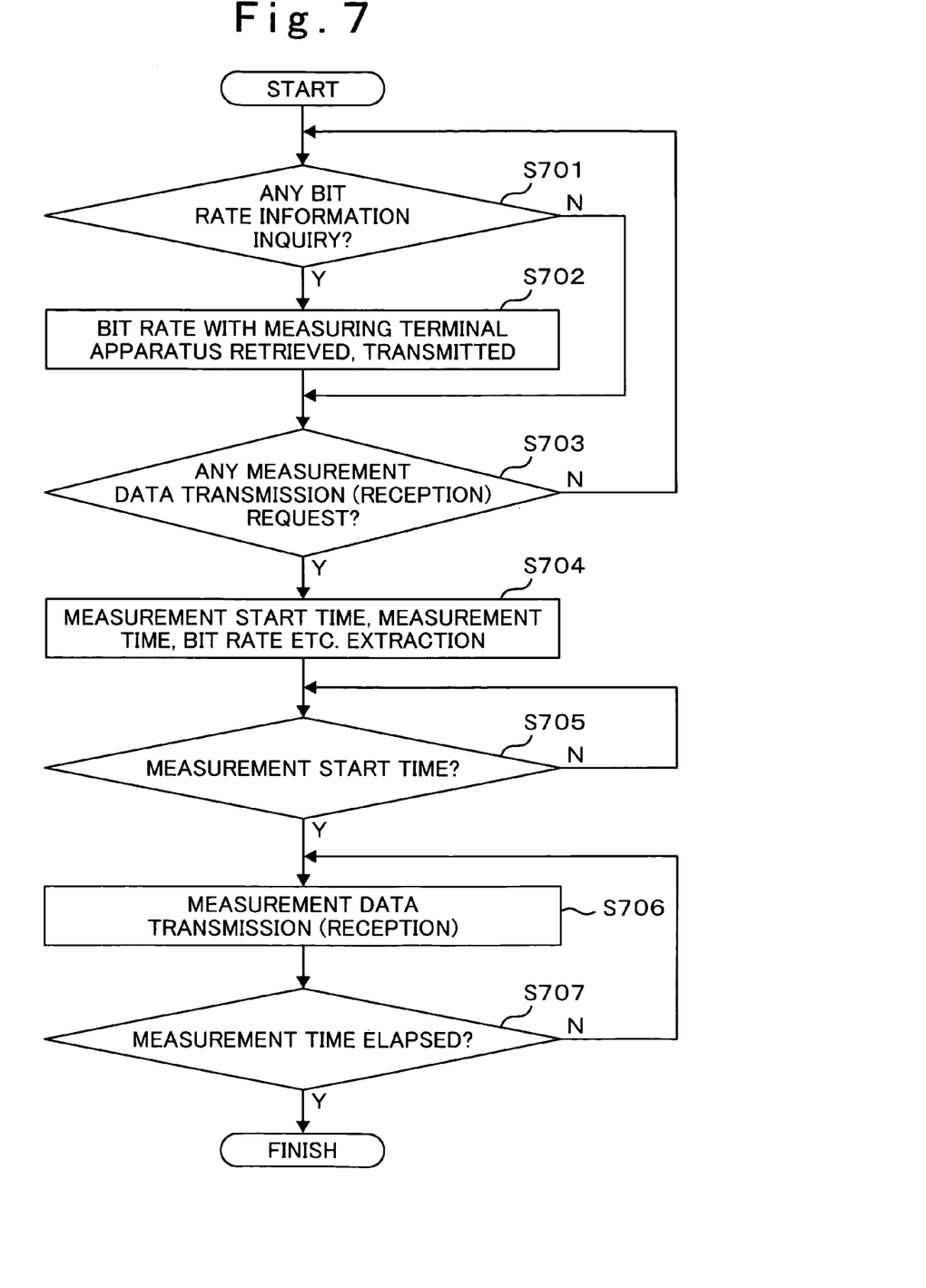
FIG. 7 is a diagram showing a flow of a communication bandwidth measurement process (for the subject terminal apparatus)

Next, a description will be given of processes in the case of operating as the subject terminal apparatus 1. FIG. 7 is a diagram showing a flow of the communication bandwidth measurement process, in the case of the terminal apparatus 1 operating as the subject terminal apparatus 1. The communication bandwidth measurement process is realized using the communication program 121 and the communication bandwidth measurement program (for the subject terminal apparatus) 123.

In FIG. 7, the controller 130 of the terminal apparatus 1, on starting the process measuring the communication bandwidth, determines whether or not it has received an inquiry for bit rate information from the measuring terminal apparatus 1 (step S701) If it determines that it has received an inquiry for bit rate information (step S701:Y), the controller 130 retrieves the bit rate from a bit rate information area, and transmits it as the bit rate information to the measuring terminal apparatus 1 (step S702). Meanwhile, if it determines that it has not received an inquiry for bit rate information (step S701:N), the controller 130 shifts to step S703.

The controller 130, after the process of step S702, or when determining in step S701 that it has not received an inquiry, determines whether or not it has received a request for a transmission, or a request for a reception, of measurement data, including the information such as the measurement starting time, the measurement time, and the measurement bit rate, from the measuring terminal apparatus 1 (step S703). If it determines that it has received a request for a transmission, or a request for a reception, of measurement data (step S703:

Y), the controller 130 shifts to step S704, while if it determines that it has received no such request (step S703:N), the controller 130 shifts to step S701.

The controller 130 extracts items of information such as the measurement starting time, the measurement time, and the measurement bit rate from the received request information (step S704) Then, the controller 130 determines whether or not the current time has reached the extracted measurement starting time (step S705) and, if it determines that the measurement starting time has not been reached (step S705:N), waits until it is reached. If the controller 130 determines that the measurement starting time has been reached (step S705: Y), when the request received is a measurement data transmission request, it transmits measurement data at the received measurement bit rate (step S706), while when the request received is a measurement data reception request, it receives measurement data transmitted from the measuring terminal apparatus 1 at the received measurement bit rate. In a case in which the measurement bit rate is not included in the request for a transmission, and the request for a reception, of measurement data, a preset measurement bit rate is used.

The controller 130 determines whether or not the measurement time extracted in step S704 has elapsed (step S707) and, if it determines that the measurement time has not elapsed (step S707:N), shifts to step S706, and repeats step S706 until the measurement time elapses. Meanwhile, the controller 130, if it determines that the measurement time has elapsed (step S707:Y), finishes the process. Then, the controller 130 carries out the processes of the previously described steps S701 to S707 until the power supply to the relevant terminal apparatus 1 goes off, or until the communication bandwidth measurement process is finished.

In the above way, according to the embodiment of the invention, the controller 130 of the subject terminal apparatus 1, on receiving a bit rate information inquiry, transmits bit rate information retrieved from the bit rate information area to the measuring terminal apparatus 1. The measuring terminal apparatus 1, based on a past record in the bit rate information received from the subject terminal apparatus 1, can decide on subject terminal apparatus 1 and a measurement bit rate for measuring a first time bit rate. This means that the measuring terminal apparatus 1, using the third subject terminal apparatus and measurement bit determination process shown in FIG. 6, can measure the bit rates, and determine the communication bandwidth.

Also, according to the embodiment of the invention, the controller 130 of the subject terminal apparatus 1, on receiving a request for a transmission, or a request for a reception, of measurement data, transmits or receives measurement data depending on contents of the received request. This means that the measuring terminal apparatus 1 can determine the bit rate with the subject terminal apparatus 1 using the measurement data.

When the terminal apparatus 1 is executing the previously described measuring terminal apparatus 1 processes or subject terminal apparatus 1 processes, no transmission and reception of messages is carried out between the terminal apparatus 1. For example, in the previously described content distribution system, no distribution of content information is carried out.

Also, in the case in which the communication system is the previously described kind of tree type content distribution system, after the terminal apparatus 1, when newly joining the network 2, determines the communication bandwidth using the communication bandwidth measurement process, the previously described introduction server apparatus selects as a connection candidate a terminal apparatus 1 of the tree-shaped hierarchical structure which has a bandwidth the same as the determined communication bandwidth, and connects the newly joining terminal apparatus 1 to the terminal apparatus 1 which is the connection candidate. In this case, the introduction server apparatus holds the communication bandwidth of all the terminal apparatus 1 participating in the network 2.

Also, in the case in which the communication system is, as previously described, a content distribution system in which a plurality of terminal apparatus 1 transmit and receive content information which each of them holds, the terminal apparatus 1, when newly joining the network 2 or regularly after joining, determines the communication bandwidth using the communication bandwidth measurement process. Then, it is arranged in such a way that the terminal apparatus 1 receives a distribution of content information requested by the user from another terminal apparatus 1, at a bit rate of an image quality and sound quality according with the determined communication bandwidth.

Heretofore, although a detailed description has been given, based on a number of drawings, of the embodiment of the invention, these are only illustrative, and it is possible to implement the invention in other aspects applying various modifications and improvements based on knowledge of those skilled in the art. For example, in the previously described embodiment, the communication system of FIGS. 1A and 1B is configured including the six terminal apparatus 1A to 1F, but the number of terminal apparatus 1 is not limited to this. Also, it is acceptable that the communication system of the previously described embodiment is, as previously described, a tree type content distribution system, or a content distribution system in which a plurality of terminal apparatus 1 transmit and receive content information which each of them holds, and it is also acceptable that it is another communication system. In short, it is sufficient that it is a communication system in which the terminal apparatus 1 carry out a communication with each other via the network 2.

Also, in the previously described embodiment, the subject terminal apparatus 1 decided on in step S301 of FIG. 3 are added by newly deciding on terminal apparatus 1, in addition to subject terminal apparatus 1 previously decided on, as shown in step S404 of FIG. 4 and step S605 of FIG. 6. For example, in a case in which the measuring terminal apparatus 1 decides on the terminal apparatus 1B and 1C as the subject terminal apparatus 1, measures the bit rates with the subject terminal apparatus 1B and 1C, then newly decides on and adds the terminal apparatus 1E as the subject terminal apparatus 1, it measures the bit rates with the subject terminal apparatus 1B, 1C and 1E. Herein, the subject terminal apparatus 1B and 1C are terminal apparatus 1 previously decided on. As opposed to this, it is also acceptable that the measuring terminal apparatus 1, after deciding on the terminal apparatus 1B and 1C as the subject terminal apparatus 1, and measuring the bit rates with the subject terminal apparatus 1B and 1C, decides on another three subject terminal apparatus 1D, 1E, and 1F, so as not to include the terminal apparatus 1B and 1C as the subject terminal apparatus 1.

Although the embodiment and modification of the present invention have been described in detail herein, the scope of the invention is not limited thereto. It will be appreciated by those skilled in the art that various modifications may be made without departing from the scope of the invention. Accordingly, the embodiment and modification disclosed herein are only exemplary. It is to be understood that the scope of the invention is not to be limited thereby, but is to be determined by the claims which follow.

What is claimed is:

1. A terminal apparatus comprising:
a communication section which carries out a communication with another terminal apparatus via a network;
a terminal determination section which decides on a plurality of other terminal apparatus as subjects of measurement used for determining a communication bandwidth between the network and the communication section;
a measurement bit rate determination section which decides on a measurement bit rate with the subjects of measurement;
a measurement section which carries out a communication with the subjects of measurement at the measurement bit rate, and measures a bit rate of the communication with the subjects of measurement; and
a determination section that tallies measurement bit rates with the subjects of measurement and determines the communication bandwidth based on the tallied measurement bit rates, wherein:
the terminal determination section increases a number of the subjects of measurement in response to measuring the bit rate, and the determination section determines the communication bandwidth in response to determining a difference between a bit rate tallied before increasing the number of subjects of measurement and a bit rate tallied after increasing the number of subjects of measurement, the difference being less than or equal to a predetermined value, or
the measurement bit rate determination section decides the measurement bit rate in response to measuring the bit rate, and the determination section determines the communication bandwidth in response to measuring a difference between a bit rate tallied before increasing the measurement bit rate and a bit rate tallied after increasing the number of subjects of measurement, the difference being less than or equal to a predetermined value.

2. The terminal apparatus according to claim 1, wherein the measurement section receives predetermined measurement data, at the measurement bit rate, from each measurement subject terminal apparatus, and measures the bit rate.

3. The terminal apparatus according to claim 1, wherein the measurement section transmits predetermined measurement data, at the measurement bit rate, to each measurement subject terminal apparatus, and measures the bit rate.

4. The terminal apparatus according to claim 1, wherein the network configuring a content distribution system which connects a plurality of terminal apparatus in a tree-shaped hierarchical structure, with a content distribution apparatus distributing content information as an apex, and enables a distribution of the content information from the content distribution apparatus to a plurality of terminal apparatus, the terminal apparatus further comprises:
a section which, when joining the network, determines the communication bandwidth, and furthermore connects to a downstream terminal apparatus, connected in the tree-shaped hierarchical structure, based on the determined communication bandwidth.

5. The terminal apparatus according to claim 1, wherein the network configuring a content distribution system which, by a plurality of terminal apparatus connected via the network transmitting and receiving among themselves content information which each terminal apparatus holds, enables a distribution of the content information, the terminal apparatus further comprises:
a section which, when joining the network or at a time of a predetermined trigger, determines the communication bandwidth, and
receives the content information from another terminal apparatus in the determined communication bandwidth.

6. A non-transitory computer-readable recording medium that stores an information processing program for a terminal apparatus that has a communication section that carries out a communication with another terminal apparatus via a network, a communication bandwidth being between the network and the communication section, the information processing program causing a computer of the terminal to execute:
deciding on a plurality of other terminal apparatus as subjects of measurement used for determining the communication bandwidth,
deciding on a measurement bit rate with the subjects of measurement;
carrying out a communication with the subjects of measurement at the measurement bit rate, and measuring a bit rate of the communication with the subjects of measurement; and
tallying measurement bit rates with the subjects of measurement and determining the communication bandwidth based on the tallied measurement bit rates, wherein:
the deciding on the plurality of other terminal apparatus comprises increasing a number of the subjects of measurement in response to measuring the bit rate, and determining the communication bandwidth in response to determining a difference between a bit rate tallied before increasing the number of subjects of measurement and a bit rate tallied after increasing the number of subjects of measurement, the difference being less than or equal to a predetermined value, or
the deciding on a measurement bit rate comprises deciding the measurement bit rate in response to measuring the bit rate, and the deciding on the plurality of other terminal apparatus determines the communication bandwidth in response to measuring a difference between a bit rate tallied before increasing the measurement bit rate and a bit rate tallied after increasing the number of subjects of measurement, the difference being less than or equal to a predetermined value.

7. A method of determining, using a terminal apparatus which has a communication section which carries out a communication with another terminal apparatus via a network, a communication bandwidth between the network and the communication section, the method comprising the steps of:
deciding on a plurality of other terminal apparatus as subjects of measurement used for determining the communication bandwidth;
deciding on a measurement bit rate with the subjects of measurement;
carrying out a communication with the subjects of measurement at the measurement bit rate, and measuring a bit rate of the communication with the subjects of measurement, and
tallying measurement bit rates with the subjects of measurement and determining the communication bandwidth based on the tallied measurement bit rates, wherein
the deciding on the plurality of other terminal apparatus comprises increasing a number of the subjects of measurement in response to measuring the bit rate, and determining the communication bandwidth in response to determining a difference between a bit rate tallied before increasing the number of subjects of measurement and a bit rate tallied after increasing the number of subjects of measurement, the difference being less than or equal to a predetermined value, or the deciding on a measurement bit rate comprises deciding the measurement bit rate in response to measuring the bit rate, and the deciding on the plurality of other terminal apparatus determines the communication bandwidth in response to measuring a difference between a bit rate tallied before increasing the measurement bit rate and a bit rate tallied after increasing the number of subjects of measurement, the difference being less than or equal to a predetermined value.

8. The terminal apparatus according to claim 1, wherein the terminal determination section decides, as a subject of measurement used for determining the communication bandwidth between the network and the communication section, the plurality of other terminal apparatus which are connected to a content distribution system for distributing predetermined content information and perform transmitting and receiving of the content information, among the plurality of other terminal apparatus.

* * * * *